United States Patent [19]

Eklund et al.

[11] Patent Number: 6,139,919

[45] Date of Patent: Oct. 31, 2000

[54] METALLIC NANOSCALE FIBERS FROM STABLE IODINE-DOPED CARBON NANOTUBES

[75] Inventors: Peter C. Eklund, Boalsburg, Pa.; Leonid Grigorian, Arvada, Colo.; Keith A. Williams; Gamini U. Sumanasekera, both of State College, Pa.; Shaoli Fang, Lexington, Ky.

[73] Assignee: University of Kentucky Research Foundation, Lexington, Ky.

[21] Appl. No.: 09/334,225

[22] Filed: Jun. 16, 1999

[51] Int. Cl.[7] ........................................................ B05D 5/12
[52] U.S. Cl. ..................................... 427/430.1; 427/443.2
[58] Field of Search ............................... 427/430.1, 443.2

[56] References Cited

U.S. PATENT DOCUMENTS

| | | | |
|---|---|---|---|
| 5,269,953 | 12/1993 | Whewell | 252/30 |
| 5,354,926 | 10/1994 | Fagan et al. | 570/129 |
| 5,380,703 | 1/1995 | Kao et al. | 505/460 |
| 5,382,719 | 1/1995 | Fagan | 570/144 |

OTHER PUBLICATIONS

Rao et al, Nature (London) (1997), 338(6639), pp. 257–259, 1997.
Hisashi Sekine, et al, "Magnetic Behavior and Structure of the Halogen–Doped Fullerene C60," J. Appl. Phys., American Institute of Physics, vol. 72 (No. 11), p. 5448–5450, (Dec. 1, 1992).
R.S. Lee et al., "Conductivity Enhancement in Single-–Walled Carbon Nanotube Bundles Doped with K and Br," Nature, p. 255–257, (Jul. 17, 1997).
L. Grigorian et al., "Reversible Intercalation of Charged Iodine Chains into Carbon Nanotube Ropes," Physical Review, The American Physical Society, vol. 80 (No. 25), p. 5560–5563, (Jun. 22, 1998).
Qing Zhu et al., "Intercalation of Solid C60 with Iodine," Nature, Nature, p. 712–714, (Feb. 20, 1992).

*Primary Examiner*—Erma Cameron
*Attorney, Agent, or Firm*—King and Schickli, PLLC

[57] ABSTRACT

A method of doping involves soaking single-walled carbon nanotubes in molten iodine. Excess physisorbed iodine may then be removed by annealing.

8 Claims, 5 Drawing Sheets

6,139,919

METALLIC NANOSCALE FIBERS FROM STABLE IODINE-DOPED CARBON NANOTUBES

TECHNICAL FIELD

The present invention relates generally to a method for doping carbon nanotubes with iodine and the resulting stable iodine-doped carbon nanotubes or metallic nanoscale fibers produced by said method.

BACKGROUND OF THE INVENTION

In 1993, Iijima and Bethune reported the synthesis of high aspect ratio (e.g.>1,000), small diameter (eg. 1–2 nm) single-walled carbon nanotubes (SWNTs) prepared in 1–2% yield from carbons generated in a catalyzed carbon DC arc discharge process[1]. In 1996, bulk synthesis of approximately 100 mg/day of nearly defect-free SWNTs having a narrow diameter distribution centered about a diameter of approximately 1.36 nm was reported by Smalley at Rice University[2]. Using pulsed (YAG) laser vaporization of a heated (eg. approximately 1,200° C.) carbon target containing 1–2% Ni/Co catalyst, the group was able to produce yields of SWNTs of approximately 70–90%. The SWNTs were found to grow in well ordered bundles with an intertubal spacing of approximately 0.30 nm. Also in 1997, Bernier and a group at Montpellier, France reported that an arc discharge between a Ni:Y catalyzed carbon anode and a pure carbon cathode produced a cathode deposit or collaret which also contained yields of SWNTs of approximately 70–90%.

[1] C. Journet et al., Nature, 388, 756 (1997).
[2] A. Thess et al., Science 273, 483 (1996).

The individual SWNTs produced by these methods may be visualized as a single graphene sheet rolled into a hollow, seamless tube. SWNTs currently produced already have been observed in TEM to exhibit a very high (~$10^3$–$10^4$) aspect ratio. A typical average diameter is in the range 1–2 nm, close to that of a DNA molecule. The SWNTs are self-assembled into bundles containing tens to hundreds of individual tubes. The energy band structure of the tubes depends critically on details of the arrangement of the carbon hexagons in the wall relative to the tube axis. Depending on the integers (n,m) that mathematically define this structure (or "chirality"), about ⅓ of the tubes are expected to be metallic, and the remaining ⅔ should be semiconducting with a typical energy gap of ~0.6 –0.7 eV, in the diameter range 1–2 $nm^3$.

[3] M. S. Dresselhaus, G. Dresselhaus, and P. C. Eklund, Science of Fullerenes and Carbon Nanotubes, (Academic Press, New York), 1996.

In addition to being high-aspect ratio metallic or semi-conducting nanofibers, SWNTs have also been found both theoretically and experimentally to exhibit extremely high mechanical strength (strength to weight ratio is ~400 times higher than in steel) and very high flexibility (~30% strain to failure)[4]. Experimentally, metallic C-SWNTs have been observed via their signature in electrical resistivity experiments[5,6,7], their STM density of states [8], and also by their thermoelectric power[6,9]. Semiconducting tubes can be converted to metallic tubes by charge transfer doping discovered by the groups of J. E. Fischer (U. Penn.)[5] and P. C. Eklund[10]. This is a particularly important discovery, as a real ensemble (sample) of SWNTs can then be completely converted by chemical treatment to either a collection of P- or n-type metallic tubes.

[4] B. I. Jakobson, C. J. Brabec, and J. Bernholc, Phys. Rev. Lett. 76, 2511 (1996).
[5] R. S. Lee, H. J. Kim, J. E. Fischer, A. Thess, and R. E. Smalley, Nature 388, 255 (1977).
[6] L. Grigorian, K. A. Williams, S. Fang, G. U. Sumanasekera, A. L. Loper, E. C. Dickey, S. J. Pennycook, and P. C. Eklund, Phys. Rev. Lett 80, 5560 (1998).
[7] L. Grigorian, G. U. Sumanasekera, A. L. Loper, S. Fang, J. L. Allen, and P. C. Eklund, Phys. Rev. B 58, R4195 (1998).
[8] J. W. G. Wildoer, L. C. Venema, A. G. Rinzler, R. E. Smalley, and C. Dekker, Nature 391, 59 (1998).
[9] J. Hone et al., Phys. Rev. Lett. 80, 1042 (1998).
[10] A. M. Rao, P. C. Eklund, S. Bandow, A. Thess, R. E. Smalley, Nature 388, 257 (1997).

The main problem hindering the utilization of this unique combination of properties is that ⅔ of all nanotubes are not metallic, resulting in relatively high electrical resistivity for the as-grown SWNT samples. Preliminary estimates for $\rho(300 \text{ K})$ range from ~600 $\mu\Omega$ cm in SWNT mats to ~100 $\mu\Omega$ cm in individual SWNT ropes, i.e, about 80 times higher than in elemental metals such as copper.

Charge transfer doping, or intercalation of SWNT ropes with either alkali metals (K, Cs)[5,7] or halogens (bromine, iodine) have been found to induce remarkable 30 to 120-fold drop in resistivity of SWNTs, thereby bringing $\rho$ (300K) values down to a level comparable to that of copper. Unfortunately, most of the intercalated SWNTs (with iodine as a noteworthy exception) are not ambient-stable and, therefore, their application potential is severely limited. Poor air stability is inherent to most intercalated carbon systems, as the intercalant usually can as easily diffuse out, as it had diffused into, the host. In addition, some intercalants, e.g., alkali metals, react with atmospheric moisture and oxygen leading to irreversible degradation of electrical properties of the intercalated carbon sample. A need is therefore identified for an improved method of doping SWNTs, wherein the ambient stability of the doped SWNTs is enhanced.

[5] R. S. Lee, H. J. Kim, J. E. Fischer, A. Thess, and R. E. Smalley, Nature 388, 255 (1977).
[7] L. Grigorian, G. U. Sumanasekera, A. L. Loper, S. Fang, J. L. Allen, and P. C. Eklund, Phys. Rev. B 58, R4195 (1998).

SUMMARY OF THE INVENTION

Accordingly, it is a primary object of the present invention to provide a method of doping SWNTs with iodine to produce relatively low $\rho(300 \text{ K})$ value nanotubes.

An additional object of the present invention is to provide stable metallic nanoscale fibers and more particularly iodine-doped carbon nanotubes which exhibit enhanced stability in the ambient environment.

Yet another object of the present invention is to provide a method of iodine doping of SWNTs, wherein the SWNTs are soaked in molten iodine in order to provide the intercalation.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purpose of the present invention as described herein, a method of doping carbon nanotubes is provided. The method may be broadly defined as including the step of soaking carbon nanotubes in molten iodine in a vessel. More specifically, the soaking of the carbon nanotubes in the molten iodine is completed at a temperature between 80–200° C. and more particularly 140–160° C. for between 0.3–24 hours and more particularly 0.5–10 hours in a sealed, evacuated vessel. This soaking selves to intercalate iodine into the carbon nanotube structure resulting in iodine-doped nanotubes. Following soaking is the annealing of the doped carbon nanotubes to remove excess physisorbed iodine. Preferably, the annealing step includes the heating of an end of the vessel containing the soaked and thus, doped carbon nanotubes and submerging an opposite end of the vessel in liquid nitrogen to collect the excess iodine driven off by the heating step.

In accordance with yet another aspect to the present invention, iodine doped carbon nanotubes resulting from the above method are provided. Advantageously, the iodine doping process of the present invention creates charge carriers in the iodine doped SWNTs. As a result, semiconducting SWNTs become metallic while metallic SWNTs become even more conductive due to the increased density of charge carriers. Further, the iodine doping penetrates into the interior of the carbon nanotube where the iodine atoms doping the interior nanotube walls are protected from external chemically active factors. As a result, high ambient stability is achieved. Thus, the iodine doped carbon nanotubes of the present invention are characterized by a number of unique properties including ambient stability, high mechanical strength and high aspect ratio. Accordingly, they are anticipated to be useful for a number of commercial and defense-related applications in such areas as electromagnetic radiation shielding, fuel cells, aerospace and batteries.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in forming a part of the specification, illustrates several aspects of the present invention, and together with the description serves to explain the principals of the invention. In the drawing.

References will now be made in detail to the present preferred embodiment of the invention.

DETAILED DESCRIPTION OF THE INVENTION

In accordance with the present invention, ambient-stable, high mechanical strength, high-aspect ratio metallic nanofibers may be prepared by doping as-grown SWNTs in molten iodine. This type of intercalation is achieved by soaking SWNTs mats in molten iodine in a sealed vessel. Preferably, during soaking the molten iodine is maintained at a temperature of approximately 80–200° C. and more preferably 140–160° C. for between 0.3–24 hours and more preferably 0.5–10 hours with the sealed vessel evacuated to $10^{-2}$ Torr.

Following soaking is the annealing of the soaked SWNTs so as to remove excess physisorbed iodine. This is accomplished by heating an end of the vessel containing the soaked SWNTs and submerging an opposite end of the vessel in liquid nitrogen to collect the excess iodine driven off in the heating step.

The unique property of iodine that is taken advantage of in the present invention is that, in a melt, electrically neutral iodine molecules ($I_2$) dissociate into reactive positive ($I^+$) and negative ($I_3$)⁻ ions:

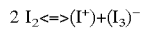

The positive ions ($I^+$) are extremely strong oxidizing agents which tend to interact chemically with carbon atoms and open up the end caps on SWNTs, allowing the polyiodide species such as ($I_3$)⁻ to penetrate into the interior of the tube and charge transfer with the SWNT walls. I-doping of the exterior wall, outside of the tube, also occurs. In effect, this iodine is located in the interstitial channels of the bundles.

The I-doping process, in either case, creates charge carriers in SWNT walls and, as a result, the semiconducting SWNTs become metallic, while metallic tubes become even more conducting due to the increased density of charge carriers. On the other hand, the iodine atoms intercalated inside the individual nanotubes are protected by the walls from external chemically active factors thereby ensuring high ambient stability. As an additional benefit, the intercalated iodine chemically reacts with the residual transition metal (e.g., Ni) catalyst atoms forming metal iodides:

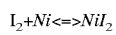

Figure 1:
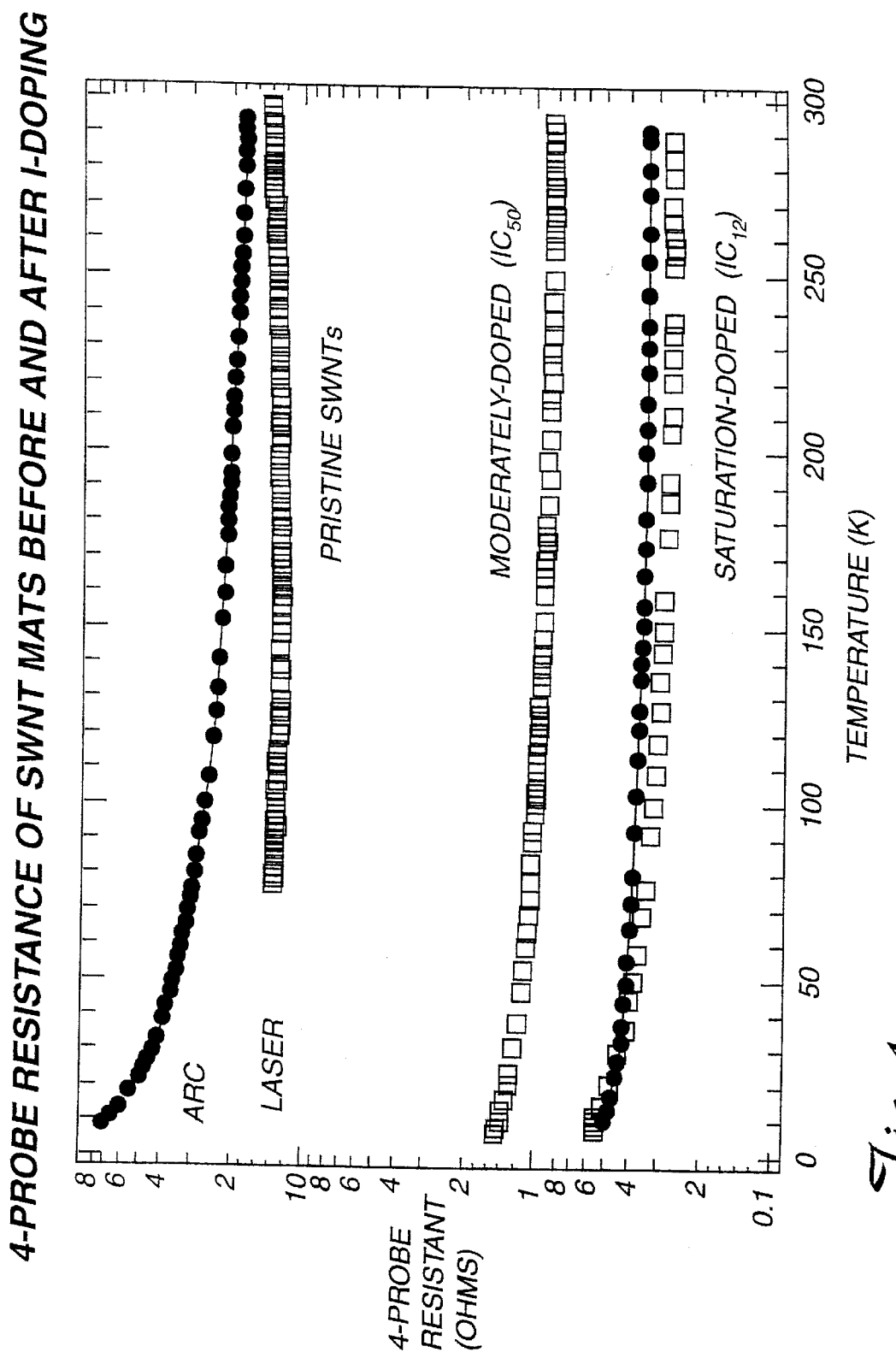
FIG. 1 is a sample plot of one embodiment of the present invention showing 4-probe resistance in ohms versus temperature in degrees K.

We have found that, unlike the unreacted (elemental) metal catalyst, the metal iodides do not efficiently scatter the conduction electrons. The combination of these two factors (i.e., charge transfer and foundation of metal iodides), results in a dramatic reduction (30–50 times at 300 K and over 100 times at temperatures below 100 K) of electrical resistivity in the iodine-doped, ambient-stable SWNT samples (see FIG. 1).

Figure 2:
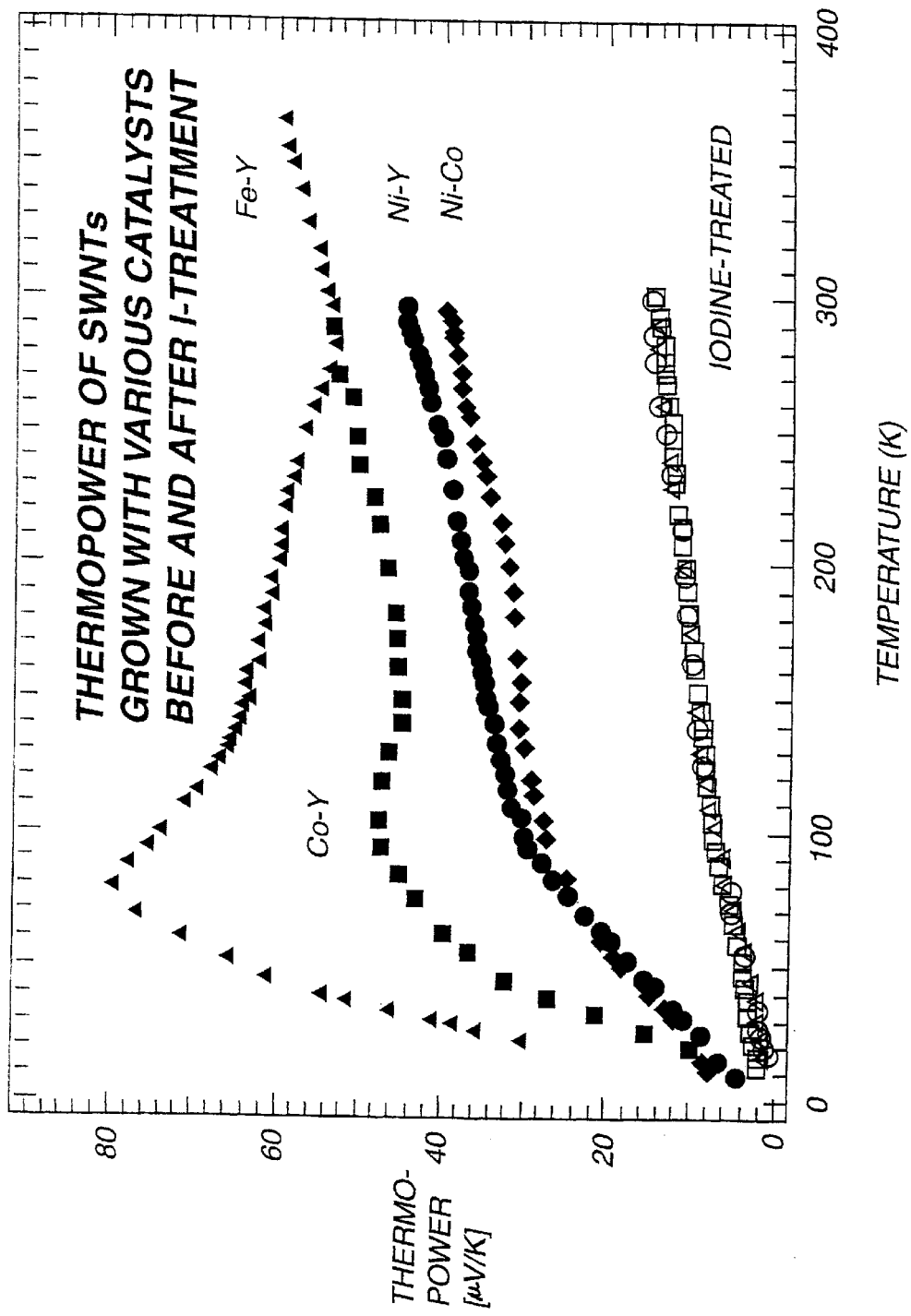
FIG. 2 is a graphical representation illustrating the thermal power of SWNTs grown with various catalysts before and after iodine treatment versus temperature in degrees K.
Figure 3:
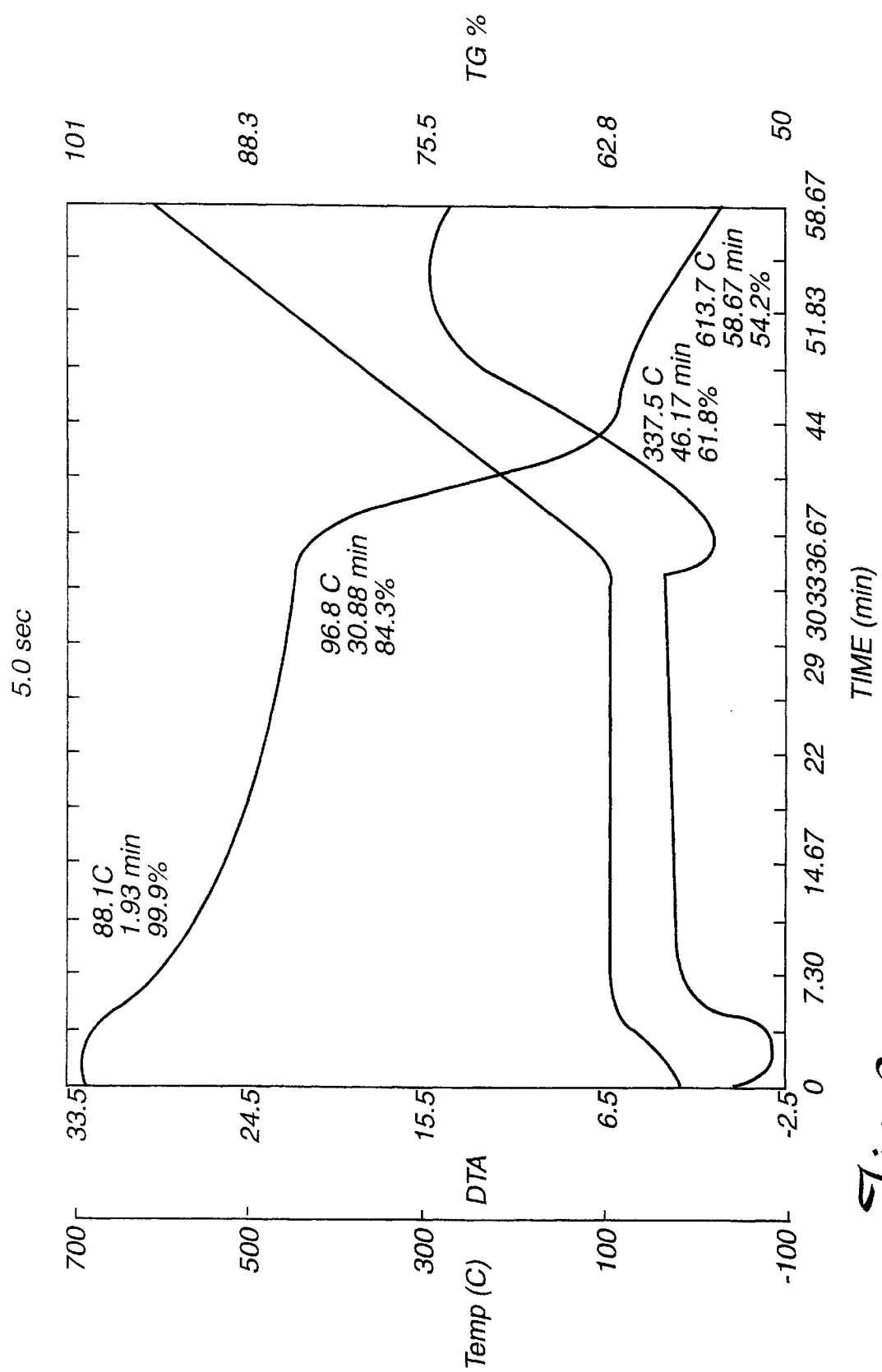
FIG. 3 is a thermogravimetric analysis plot for iodine-doped SWNTs made in accordance with the present method.
Figure 4A:
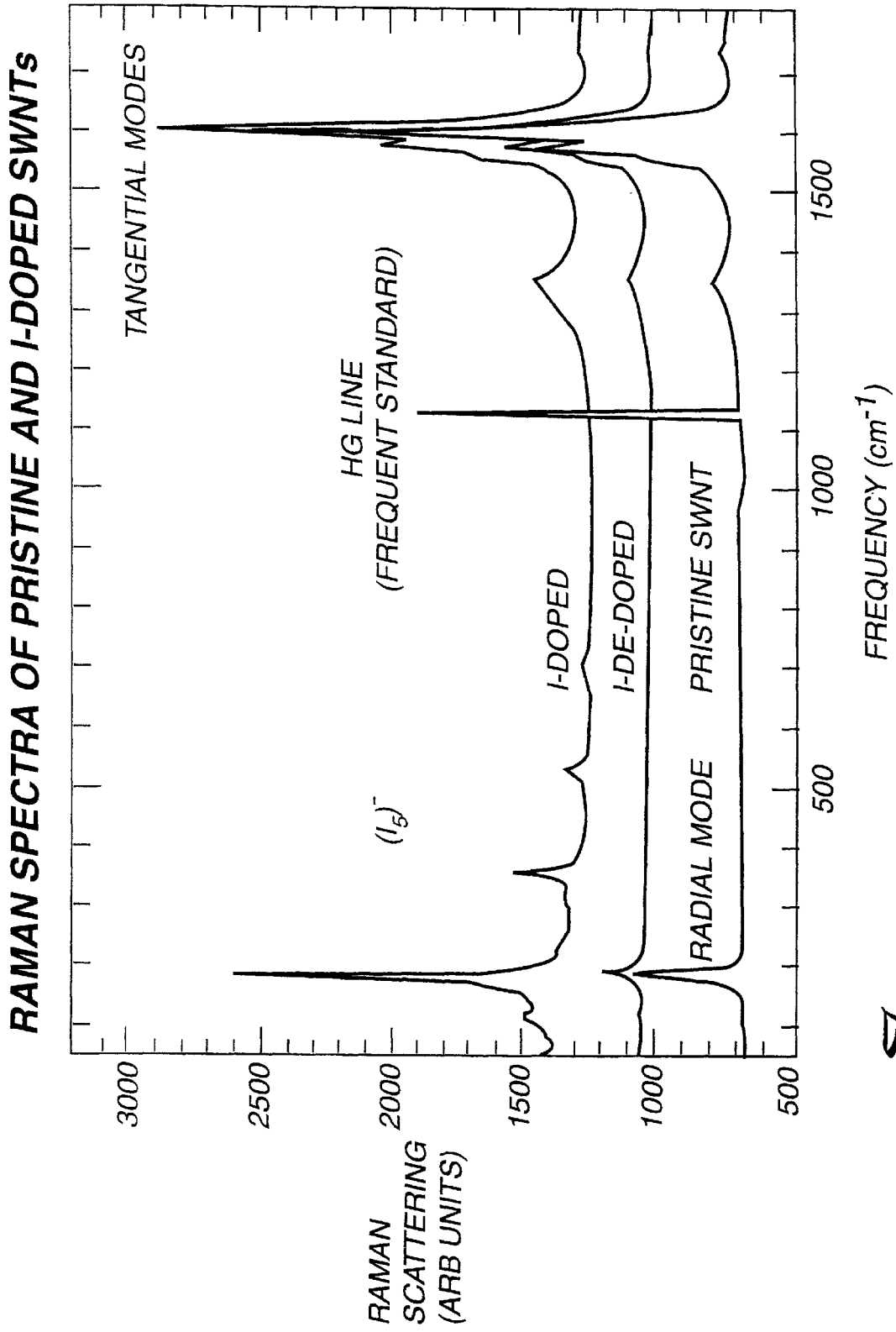
FIGS. 4a and 4b are Raman spectra of pristine and iodine-doped SWNTs prepared in accordance with the method of the present invention.
Figure 4B:
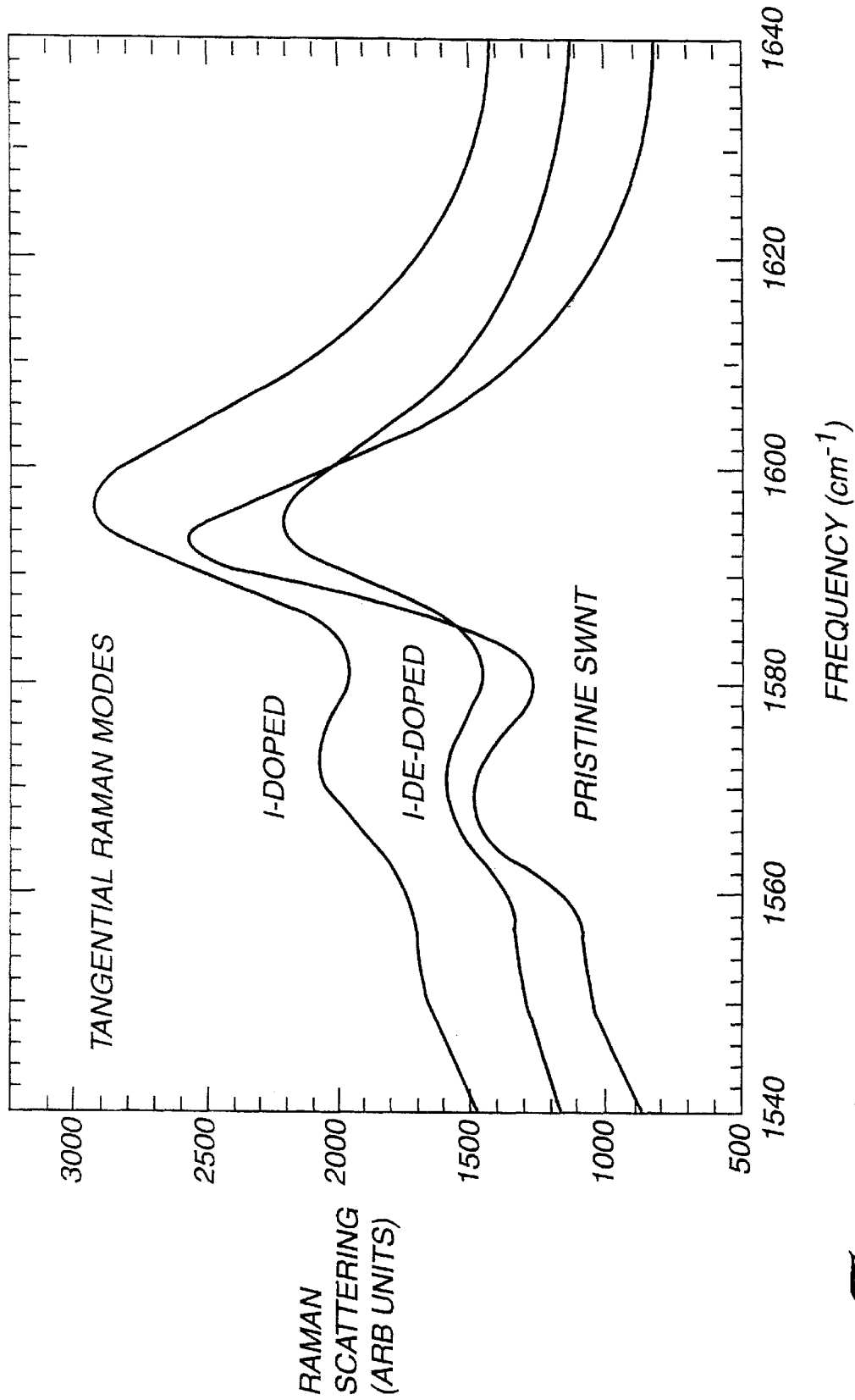

The SWNT samples can be doped with iodine continuously until reaching the saturation composition of $\sim C_{12}I$. Iodine can then be readily de-intercalated (or removed) either partially (e.g., to $C_{50}I$), or completely, by heating the doped C-SWNT samples in vacuum to 80 to 600° C. for 2 to 24 hours. Iodine interaction with SWNT bundles by means of the presently described method is evidenced by extensive and detailed studies of electrical transport (FIGS. 1 & 2), thermogravimetric analysis (FIG. 3), Raman scattering (FIGS. 4a & 4b), x-ray diffraction[6], and high-resolution transmission microscopy[6].

[6]L. Grigorian, K. A. Williams, S. Fang, G. U. Sumanasekera, A. L. Loper, E. C. Dickey, S. J. Pennycook, and P. C. Eklund, Phys. Rev. Lett 80, 5560 (1998).

The following examples are presented to further illustration the invention, but it is not be considered as limited thereto.

EXAMPLE 1

Ambient-stable, high mechanical strength, high-aspect ratio metallic nanofibers, $C_xI$ ($x \geq 12$) were produced by soaking as-grown SWNT mats in molten iodine at reaction temperature $T_r$=80–200° C. (preferred $T_r$=140 to 160° C.) for 0.5–10 hours inside a sealed evacuated (to $10^{-2}$ Torr) pyrex reactor tube. The reaction temperature $T_r$ was chosen to be high enough to ensure that all of the loaded iodine in the pyrex reactor was molten and had low enough viscosity to diffuse inside the SWNT bundles efficiently. Using too high a temperature ($T_r>160°$ C.) could have led to a rupture of the reactor walls due to a built-up of high iodine vapor pressure. If too low $T_r<80°$ C. was used, the iodine would not have been molten, or would have taken several days instead of hours to diffuse into the SWNT sample and complete the reaction.

Then, in order to remove all the excess, unreacted iodine, the end of the reactor containing the doped sample was heated to 80–100° C. for 12–24 hours, while the other end was cooled with liquid nitrogen to collect the evolving iodine. The process was stopped when no more iodine seemed to evolve from the heated end (this can be readily determined by the absence of intense pink iodine vapor coloring), and the sample was then taken out of the reactor.

EXAMPLE 2

Intercalation was completed by immersing SWNT mats in molten iodine in evacuated quartz tubes at a temperature T=140° C. for 5 hours in accordance with the above-described method. All measurements for both laser-produced and arc-produced SWNT samples produced similar results. Following intercalation, the doped SWNTs were annealed. Specifically, the end of the quartz tube containing the doped SWNTs was heated to 60–80° C. for 2–4 hours while the other end was submerged in liquid nitrogen in order to collect excess iodine as it was driven off. The resulting iodine-intercalated SWNT samples were found to be stable under ambient conditions, thereby allowing measurements to be carried out in air. Thermogravimetric analysis (TGA) experiments were performed on the iodine-intercalated SWNTs by heating from 20° to 400° C. over 2 h in He gas while monitoring the weight loss. Notable weight loss did not commence until T~100° C., and the intercalated iodine was essentially removed at T~250° C. The complete removal of intercalated iodine below detection limits was subsequently confirmed by XRD, Raman, photo luminescence (PL), and energy-dispersive x-ray spectroscopy (EDXS). The weight uptake and TGA experiments on high purity (>90% by transmission electron microscopy) SWNT samples both suggest that an average composition for the saturation iodine-doped SWNT is close to $ICl_2$.

XRD

XRD data were collected using a Rigaku diffractometer ($CuK_\alpha$ radiation). XRD patterns of both the laser-and arc-produced pristine SWNT samples were dominated by a strong peak at $2\theta\sim6°$ identified as the[11] reflection from the triangular rope lattice corresponding to an average lattice spacing $d_{11}\sim14.72$ Å and a lattice constant $\alpha\sim16.8$ Å. In addition to the[11] and other higher-order features, peaks due to graphite and the metal catalysis impurities were observed at $2\theta\sim26.8°$ and ~44.5°, respectively. Upon further iodine intercalation, intensities of the diffraction peaks due to the open lattice fell below the detection limit. However, in the de-intercalated samples, the[11] peak was observed to reappear near its original position at $2\theta\sim6°$. The overall intensity distribution in the XRD patterns of the de-intercalated samples was different from that of the pristine samples, suggesting that although the intercalated iodine had been removed (as verified by other probes), the initial stacking of the tubes in the rope lattice did not fully recover.

[11]A. B. Kaiser, G. Dusberg and S. Roth, Phys. Rev. B 57, 1418 (1998).

In the case of incomplete de-intercalation, i.e., when residual iodine was left in the sample, a broadened and weakened[11] peak was observed at $2\theta<6°$, indicating that the rope lattice was expanded and disordered. Using XRD data obtained from one of these partially de-intercalated samples, we estimate a lattice constant $\alpha\sim18.5$ Å, that is, ~11% larger as compared to pristine SWNTs. It should be noted that the (002) peak of nanoscale graphite particles coexisting with the SWNT in the sample was unshifted with doping, indicating that iodine does not intercalate into nanoscale graphite.

[11]A. B. Kaiser, G. Dusberg and S. Roth, Phys. Rev. B 57, 1418 (1998).

The x-ray data indicate that some of the iodine acts as a "chemical wedge," entering the interstitial channels between nanotubes, overcoming the van der Waals attraction between the tubes to force them farther apart. At high iodine uptake levels, the rope lattice expands, and coherent placement of the tubes within the ropes is lost. However, since the tubes are very long, it is likely that the intercalated iodine chains in the interstitial channels will have voids at various points along their length so that tubes would maintain their van der Waals contact within these voids. When iodine is removed, these voids then nucleate the restoration of coherent bundles, much like the action of a zipper. Once the tubes have zipped back into ropes, the lattice energy of the ropes will again be minimized and the coherent x-ray scattering from the ropes is partially restored, though with some residual disorder.

Z-contrast STEM

Z contrast scanning transmission electron microscopy (STEM) was used to obtain information regarding the spatial distribution of the intercalated iodine within the SWNT lattice. In this technique, a focused electron beam is rastered across the sample while a large angle annular detector collects the transmitted electrons scattered to high angles. Since the high-angle scattering is dominated by thermal diffuse scattering, the Z contrast image intensity scales with the atomic number squared ($Z^2$). Large intensity differences between carbon (Z=6) and iodine (Z~53) are therefore observed in Z-contrast images. Z contrast images of pristine SWNTs show almost no contrast within a rope. The image of SWNTs doped with iodine in accordance with the present method shows stripes which we attribute to continuous, linear iodine chains located in the interstitial channels of the rope. The average spacing between the stripes was measured to be ~21 Å. In this moderately intercalated sample, the iodine fills only a part of all the interstitial channels in the SWNT bundle, and therefore the average spacing of the iodine strips appears larger than the diameter of the tubes. Upon de-intercalation, almost all of the linear contrast (bright stripes parallel to tube axis) disappears except for that associated with a few remnant iodine chains.

Raman Scattering

Analysis of the Raman scattering data obtained with Ar laser excitation (514.5 nm) in the backscattering geometry can be used to investigate charge transfer between the dopant and SWNTs and to identify the dopant species. We first address the Raman modes associated with intercalated iodine. In a moderately doped sample, new peaks (not associated with SWNTs) are observed at 175, 138, and 109 $cm^{-1}$ and a harmonic series (2 $\omega_0$, 3$\omega_0$, . . . ) of the $\omega_0$=175 and 109 $cm^{-1}$ peaks also appear in the low frequency region. We attribute the strong 175 and weaker 109 $cm^{-1}$ peaks and their overtone progressions, respectively to resonant Raman scattering from charges $(I_5)^-$ and $(I_3)^-$ linear chain complexes. This assignment is based on comparison of our results with previous work in which resonant Raman scattering, Mossbauer spectroscopy, and x-ray diffraction were used to identify the iodine species (R. C. Teitelbaum., S. L. Ruby and T. J. Marks, J. Am. Chem. Soc. 101, 7568 (1979)). In the saturation-doped SWNT sample, all iodine appears converted to $(I_5)^-$. This observation agrees with our preliminary x-ray photo emission spectroscopy data, which show a resolved doublet I(3d$_{5/2}$) at ~618 and ~620 eV in the moderately doped sample, while the saturation-doped sample exhibits only the ~620 eV peak. These pears are assigned, respectively, to charged (I$_3$)$^-$ and (I$_5$)$^-$ polyiodide chains, according to similar studies carried out on iodine-doped polyaniline (Xing-Rong Zeng and Tse-Man Ko, J. Polym. Sci. B 35, 1993 (1997)). Moreover, our observation that (I$_3$)$^-$ forms at low iodine doping levels, and converts to (I$_5$)$^-$ at higher doping levels, has also been reported for several organic polymers (see also S. Flandrois, C. Hauw and B. Francois, J. Phys. (Pans), Colloq. 44 C523 (1983) and D. Wang, S. Hasegawa, M. Shimizu and J. Tanaka, Synth. Met. 46, 85 (1992)). It should be noted that we did not observe any Raman peaks around 215 cm$^{-1}$ which would be expected if neutral molecular iodine (I$_2$)$^\circ$ were present in our samples. The iodine-doped SWNTs also exhibited a broad PL band which disappeared in the de-intercalated samples, and is therefore attributable to polyicdide chains in the rope lattice.

Next we discuss doping-induced changes in the SWNT-related Raman modes. The distinctive features of the Raman spectra for pristine SWNTs include two strong, first-order bands at 186 and 1593 cm$^{-1}$. The band at 186 cm$^{-1}$ has been identified with the A$_{1g}$-type, radial "breathing" modes. The band at 1593 cm$^{-1}$ has been assigned to an unresolved Raman triplet identified with tangential carbon atom displacement modes. These three, nearly degenerate, high-frequency tubule phonons are related to the E$_{2g}$(q=0) symmetry intralayer mode in graphite at 1582 cm$^{-1}$. As discussed previously, the Raman bands of SWNTs are inhomogeneously broadened due to the tube diameter distribution; the effect is most important for $\omega \leq 500$ cm$^{-1}$. The main effect of polyiodide chain intercalation on the high-frequency Raman triplet is an up-shift of these modes by 8 cm$^{-1}$. This sizable up-shift was observed to correlate with the doping level, and the original frequencies of these tangential modes were fully recovered after de-intercalation. This is clear evidence that the intercalation is reversible and that the tube walls remain intact in the process. We attribute the iodine-induced up-shift to electron transfer from the SWNTs to the iodine chains. By analogy to acceptor-intercalated graphite compounds, a transfer of carbon π-electrons to the intercalant is expected to induce a contraction of the hexagonal rings along the cylindrical wall of the SWNTs, up-shifting the tangential mode frequencies, as observed.

In the I-doped samples, the position of the radial SWNT mode band cannot be easily detected, perhaps because it lies very close in frequency to the strong resonantly enhanced (I$_5$)$^-$ mode at 175 cm$^{-1}$. Interestingly, in the fully de-intercalated samples, the radial mode band reappears down-shifted by ~2 cm$^{-1}$ from its original position in the pristine material. We interpret this lowered frequency as indication of a decreased van der Waals interaction between the tubes in the de-intercalated rope. This result is consistent with the XRD data obtained for fully de-intercalated samples, which reveal that the original packing of the tubes in a rope is not completely restored.

Transport Properties

The effect of iodine doping on both SWNT materials (arc and laser prepared) was found to produce essentially identical results. Specifically, increasing iodine concentration in the ropes reduces the mat resistance over the entire temperature range: a factor of ~40 reduction was observed at T=300 K upon saturation doping. For pristine SWNT mats, S(T) is strongly positive and a factor of ~20 larger than that observed for semimetallic graphite (~2 $\mu$ V/K). This may be due to semiconducting tubes present in the material, as considered in a model proposed recently. Upon increased iodine doping, the overall thermopower remains positive, but it is significantly reduced over the entire temperature range. The lower values are more consistent with that of a metallic system, and suggest that the semiconducting tubes have been degenerately doped in the process. Taken collectively, the R(T) and S(T) data indicate that the effect of iodine doping is to introduce a significant increase in the concentration of mobile holes in nanotube π electron bands.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

In the claims:

1. A method of doping carbon nanotubes, comprising:

soaking said carbon nanotubes in molten iodine in a vessel.

2. The method of claim 1, further including annealing said carbon nanotubes after soaking so as to remove excess physisorbed iodine.

3. The method of claim 2, wherein said annealing includes heating an end of said vessel containing said soaked carbon nanotubes and submerging an opposite end of said vessel in liquid nitrogen to collect excess iodine as said excess iodine is driven off by said heating.

4. A method of doping carbon nanotubes, comprising:

soaking said carbon nanotubes in molten iodine at a temperature between 140–160° C. for between 0.5–10 hours in a sealed, evacuated vessel.

5. The method of claim 4, further including annealing said carbon nanotubes after soaking so as to remove excess physisorbed iodine.

6. The method of claim 5, wherein said annealing includes heating an end of said vessel containing said soaked carbon nanotubes and submerging an opposite end of said vessel in liquid nitrogen to collect excess iodine as said excess iodine is driven off by said heating.

7. Iodine doped carbon nanotubes prepared in accordance with the method of claim 1.

8. Iodine doped carbon nanotubes prepared in accordance with the method of claim 4.

* * * * *